March 13, 1951     V. VOORHEES     2,545,179
SUBMARINE MARKER WITH SONIC SIGNAL GENERATORS
Filed April 7, 1948
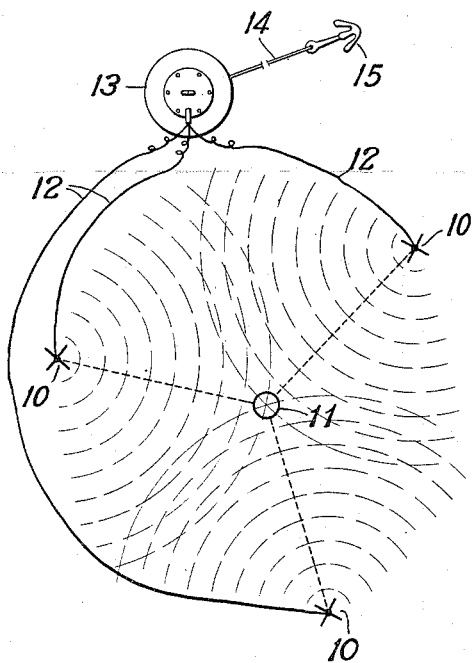
Fig. 1
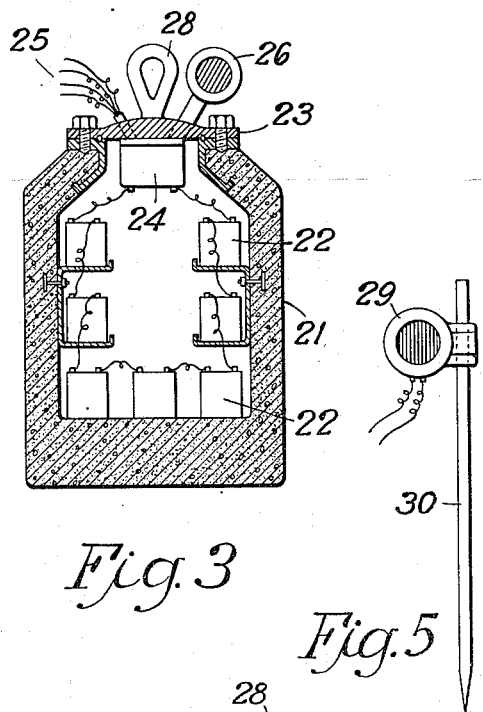
Fig. 3
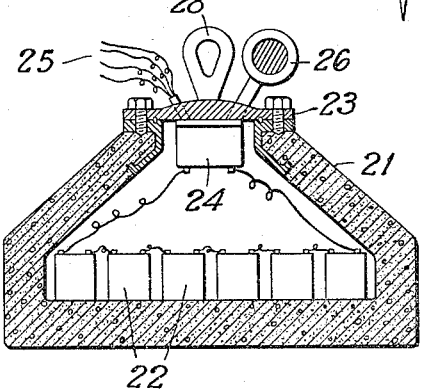
Fig. 5
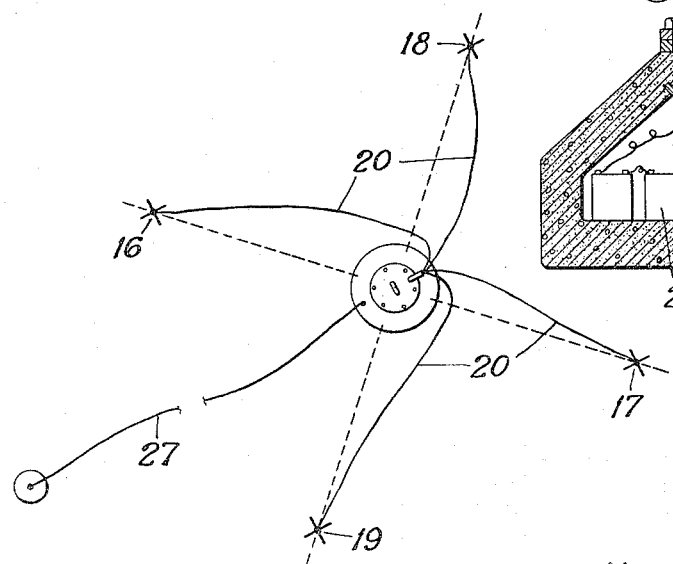
Fig. 2
Fig. 4
INVENTOR.
Vanderveer Voorhees
BY
Pike H. Sullivan
ATTORNEY Patented Mar. 13, 1951

2,545,179

UNITED STATES PATENT OFFICE 2,545,179

SUBMARINE MARKER WITH SONIC SIGNAL GENERATORS

Vanderveer Voorhees, Homewood, Ill., assignor to Standard Oil Company, Chicago, Ill., a corporation of Indiana Application April 7, 1948, Serial No. 19,547

2 Claims. (Cl. 177—386)

This invention relates to a method and apparatus for submarine surveying, and particularly to a method and apparatus for establishing fixed reference points or bench marks on the surface of the ground lying beneath bodies of water such as lakes and bays and the shallower portions of the ocean such as the continental shelf. In surveying and exploring for oil in these areas, for example, considerable difficulty has been encountered in establishing reference positions which can be easily and accurately located and positively identified. It is an object of this invention to provide an apparatus and method for establishing more or less permanent bench marks in areas where the depth of water is too great to permit the use of the ordinary methods. It is also an object of this invention to provide such bench marks at relatively low cost. It is still a further object of the invention to provide a bench mark for the purpose indicated which will not interfere with normal uses of the water, navigation, fishing, etc., and which will be substantially unaffected by storms and other disturbances destructive to the usual type of marine markers. Other objects of the invention will be apparent from the following description thereof.

The invention is illustrated by a drawing which shows diagrammatically in Figure 1 one installation of the bench mark using an anchored buoy;

Figure 2 describes an installation similar to that of Figure 1 but employing no surface apparatus;

Figures 3 and 4 illustrate in section different modifications of the power plant employed to actuate the marker; and Figure 5 shows a form of vibrator which may be used in connection with the marker.

One of the problems encountered in surveying submarine geophysical formations for the purpose of obtaining evidence useful for indicating presence and location of submarine petroleum deposits has been the difficulty of making accurate surveys and establishing reproducible locations. Thus, the seismographic method of surveying requires accurate plotting of points at which shots are made and reflected vibrations are received. Established navigational methods for locating such positions are incapable of sufficient accuracy for the purpose. Buoy markers anchored to the bottom are difficult to find because of the tremendous areas involved. Furthermore, the accuracy of their location is always subject to question because of possible movement by the action of waves and wind. They also create a hazard to shipping. In addition, buoys cannot be used conveniently to give the exact location of a given spot because of the drag of the anchor cable, depending on the direction of the current, the wind, etc. One of the methods which has been used in this work is a radar method whereby triangulation is made from the survey ship to radar-visible targets on the shore. This method, altho relatively accurate for distances up to ten miles from the shore targets, becomes increasingly less accurate at greater distances because of the necessity of establishing additional floating targets at ten-mile intervals, owing to the straight-line characteristic of the radar beam rendering it incapable of following the earth's curvature for greater distances under the conditions imposed. At distances of thirty miles from shore this method is only accurate to within two or three hundred yards. Even where this degree of accuracy is acceptable, the method is still objectionably costly and slight errors in its use can destroy the value of much expensive data.

According to this invention any spot on the marine floor can be marked and relocated with exactness in reasonable depths of the order of 100 to 500 feet. Primarily the method involves the anchoring of a signal device capable of emitting a signal wave which can be detected and recognized at a reasonable distance, for example, one to five miles. Under some conditions, the signal wave may be a radio wave but it is preferred to employ sonic or supersonic vibrations in the water. Hereafter, in this specification and claims the term "sonic" is used in the broad sense to include supersonic. When the signal has been detected and its direction located by a suitable listening device on the survey ship, the ship proceeds in that direction until a secondary signal is heard arising from synchronized vibrators surrounding the exact location desired.

Referring to Figure 1, the marker is first established by placing on the bottom three or four vibrators or sonic wave generators 10 in the form of a triangle or rectangle surrounding the exact point 11 desired to be located. Each of the vibrators is connected by suitable electric leads 12 to floating power plant or buoy 13 securely anchored by cable 14 to anchor 15. The buoy 13 is provided with a suitable source of power, preferably electric batteries. An oscillating mechanism within the power plant 13 energizes the vibrators 10 periodically, for example, at frequencies of 1 to 100 vibrations per second, thereby causing the vibrators 10 to emit sonic waves which are carried thru the water and interfere at all points except points on a vertical line extending from point 11 to the surface, these points being equidistant to the vibrators 10. A sound detector suspended in the water is used to explore the area and locate with exactitude the point where the synchronized vibrations are in phase. To distinguish between node points, relative intensity of vibrations may also be determined. By using a wave of variable frequency pattern, identically and simultaneously emitted by two generators at a distance, the exact midpoint can be readily determined.

If desired, the work of location may be facilitated by the use of four vibrators instead of three, operating one pair at one frequency and the other pair at a different frequency, thus making it possible to proceed along the line of one set of vibrators until exactly midway between them and then proceed along the line between the other pair of vibrators until the midpoint to them is reached, the two midpoints coinciding with the exact location to be ascertained.

A radio signal emitted above water or sonic signal produced under water is intermittently sent out from the power plant 13 with sufficient energy to be detected at a reasonable distance from the site, for example one to five miles or more, the purpose of this signal being to permit detection of the approximate location of the bench mark over a considerable area. It is desirable that this signal have a characteristic frequency or code for each marker in a given general area. This characteristic, both frequency and code, may be recorded in a log book or chart to aid identification. Thus, where the long range signal is a radio wave it may have a frequency of 100–200 megacycles, which may be the same for all the markers in a given area, but the wave may be interrupted at a different period for each marker in the area. For example, adjacent markers may radio a signal at intervals of one second and one-half second respectively in order to avoid confusion. A direction finder on the survey ship can be used to direct the course to any desired marker.

In order to avoid difficulties arising from collision with floating apparatus in the ocean as mentioned hereinabove, power plant 13 may be located on the bottom as shown in Figure 2. Here four vibrators 16, 17, 18 and 19 are shown attached to the ocean floor and connected to the power plant 13 by electric cables 20. As hereinbefore described, opposed vibrators 16 and 17 are synchronized at one frequency and vibrators 18 and 19 at another, and the power plant is accurately located at the midpoint between each pair. In this case where the power plant is submerged, it is not practical to use a radio signal for long-range detection and it is preferred to use a sonic signal conducted by the water. It is desirable that the signal be sent at intervals, for example one-tenth of a second to five seconds, and that it be of very short duration in order to conserve power. The signals emitted by vibrators 16 to 19 need be supplied with only sufficient energy to produce a detectable signal in the immediate vicinity. The spacing of the vibrators 16 to 19 bears a relation to the depth of the water encountered, it being usually desirable that the distance between pairs of vibrators be from about twice the depth of the water to six times the depth of the water. When returning to the location, the exact position of power plant 13 may be found by a listening instrument submerged in the water near the surface and the power plant may be raised and reserviced when necessary.

Figure 3 shows one form of power plant construction suitable for locating on the bottom which comprises a shell 21 which can be constructed of steel, reinforced concrete or other suitable material with sufficient strength to resist the water pressure at the point where it is to be located. Within the shell, which is suitably cylindrical, are batteries 22 which can be supported on shelves accessible from the top. The top of the case is closed by a steel cover 23, preferably bolted in place with a water-tight gasket. Inside the cover is located the signaling mechanism 24 which includes the radio transmitter if that is employed, and/or the energizers for sonic vibrators. Usually a balanced oscillating pendulum switch of an established period is employed for emitting the desired signal code. Insulated electrical connections 25 lead from the power plant to the respective vibrators. The vibrator for long-range under water sonic signaling is indicated at 26. Batteries 22 may be either rechargeable storage batteries or primary cells having long life characteristics such as the copper-zinc wet cell, altho the later requires a stationary foundation and is not suitable for buoy installation as shown in Figure 1. Where storage cells are used they can suitably be either the lead or the iron-nickel type, the latter having the advantage of longer charge life. In order to recharge storage cells it is not always necessary to remove them from the case but a complete fresh power plant may be substituted for one that is nearing exhaustion and the exhausted power plant may be recharged as a unit. Also, in the case of power plants located at the bottom as in Figure 2, a charging cable 27 may be left extended on power plant 13 in a known position so that it can be recovered from the servicing ship and used to recharge the batteries, the end of cable 27 being adequately sealed against entrance of water and short circuiting.

When the marker is located in relatively shallow water where it is subjected to considerable wave action at the bottom, or where it may be in the path of nets of fishing fleets, the power plant or battery case may be constructed in the form of a cone as shown in Figure 4, corresponding parts being numbered as in Figure 3. An eye 28 attached to the top of the case is provided for raising and lowering by derrick.

Wave generators for precise location may be anchored to the bottom in various ways, one construction being shown in Figure 5 in which the electrical vibrator or sounder 29 is mounted on a pin or spike 30 which can be driven into the bottom by a suitable driving rod, not shown, lowered from the surface, for example a heavy bar supported by cable from a derrick to the lower end of which the spike 30 is removably attached. It is preferred to employ the mounting or spike sufficiently long to allow the vibrator 29 to come to rest slightly above the bottom to prevent it from becoming overlain with soil deposits which would tend to dampen the vibrations.

In addition to its use in submarine surveying, my method of establishing locations under water can be used in locating oil well bores drilled under water. Thus, when prospecting for oil by drilling from a barge, the drilling equipment can be removed from the site and returned to the exact position to continue drilling operations.

Having thus described my invention what I claim is:

1. A marker for precisely indicating a submerged marine location which marker comprises at least three short-range sonic wave generators located in fixed array upon the marine floor about said location, said generators being equidistant from said location, a submerged self-contained power source for said generators immediately adjacent said array and anchored to the marine floor, a long-range underwater sonic signal generator adjacent and electrically connected to said power source, conducting cables from each of said short-range sonic wave generators to said submerged self-contained power source, and a timer within said self-contained power source for synchronously energizing said plurality of sonic generators by electrical energy from said power source.

2. The marker of claim 1 wherein said power source comprises a water and pressure-resistant shell containing batteries and a timer mechanism, and a vibrator outside said shell comprising the long-range underwater sonic signal generator.

VANDERVEER VOORHEES.

REFERENCES CITED

The following references are of record in the file of this patent:

UNITED STATES PATENTS

| Number | Name | Date |
|---|---|---|
| 1,310,563 | Elia | July 22, 1919 |
| 1,610,779 | Hewett | Dec. 14, 1926 |
| 1,615,712 | Loth | Jan. 25, 1927 |
| 1,937,026 | Loth | Nov. 28, 1933 |
| 1,961,767 | Key | June 5, 1934 |

FOREIGN PATENTS

| Number | Country | Date |
|---|---|---|
| 146,959 | Great Britain | July 6, 1920 |
| 407,287 | Germany | Dec. 19, 1924 |
| 431,975 | Germany | July 19, 1926 |